United States Patent [19]

Ubhayakar

[11] Patent Number: 5,021,798
[45] Date of Patent: Jun. 4, 1991

[54] ANTENNA WITH POSITIONABLE REFLECTOR

[75] Inventor: Shivadev K. Ubhayakar, Rancho Palos Verdes, Calif.

[73] Assignee: TRW Inc., Redondo Beach, Calif.

[21] Appl. No.: 346,445

[22] Filed: May 1, 1989

Related U.S. Application Data

[63] Continuation-in-part of Ser. No. 156,256, Feb. 16, 1988, Pat. No. 4,848,179, Ser. No. 156,388, Feb. 16, 1988, and Ser. No. 304,148, Jan. 1, 1989.

[51] Int. Cl.$^5$ .............................................. H01Q 3/00
[52] U.S. Cl. .................................. 343/762; 343/880; 343/839; 343/DIG. 2
[58] Field of Search .............. 343/762, 761, 880, 884, 343/878, 839, DIG. 2; 74/479; 901/22, 23, 28

[56] References Cited

U.S. PATENT DOCUMENTS

| | | | |
|---|---|---|---|
| 2,659,818 | 11/1953 | Torrey | 343/762 |
| 2,956,248 | 10/1960 | Strand | 343/757 |
| 3,712,481 | 1/1973 | Harwood | 214/1 |
| 4,298,877 | 11/1981 | Sletten | 343/781 GA |
| 4,393,728 | 7/1983 | Larson et al. | 74/469 |
| 4,494,417 | 1/1985 | Larson et al. | 74/469 |
| 4,535,338 | 8/1985 | Ohm | 343/781 GA |
| 4,550,319 | 10/1985 | Ganssle et al. | 343/DIG. 2 |
| 4,562,441 | 12/1985 | Beretta et al. | 343/DIG. 2 |
| 4,607,578 | 8/1986 | Inoue et al. | 108/145 |
| 4,621,965 | 11/1986 | Wilcock | 414/7 |
| 4,647,939 | 3/1987 | Kolhoff | 343/765 |
| 4,651,589 | 3/1987 | Lambert | 74/469 |
| 4,786,913 | 11/1988 | Barendregt et al. | 343/762 |
| 4,848,179 | 7/1989 | Ubhayakar | 901/22 |

OTHER PUBLICATIONS

A. Hemani, *Robotics* 1 (1985) pp. 27–36. "Study . . . Lightweight & Flexible Robot Manipulator".

*Primary Examiner*—Andrew J. James
*Assistant Examiner*—Hoanganh Le
*Attorney, Agent, or Firm*—Ronald M. Goldman; Ronald L. Taylor

[57] ABSTRACT

A horn type microwave antenna includes a main reflector and sub-reflector that are supported in proper spaced relationship by flexidigit robotic manipulators, multisection arms that are capable of positional changes, whereby the supports may be changed in position responsive to the application of control voltages. At least a portion of the manipulators include piezo electric actuators, permitting rapid adjustment of the reflectors' position.

2 Claims, 2 Drawing Sheets

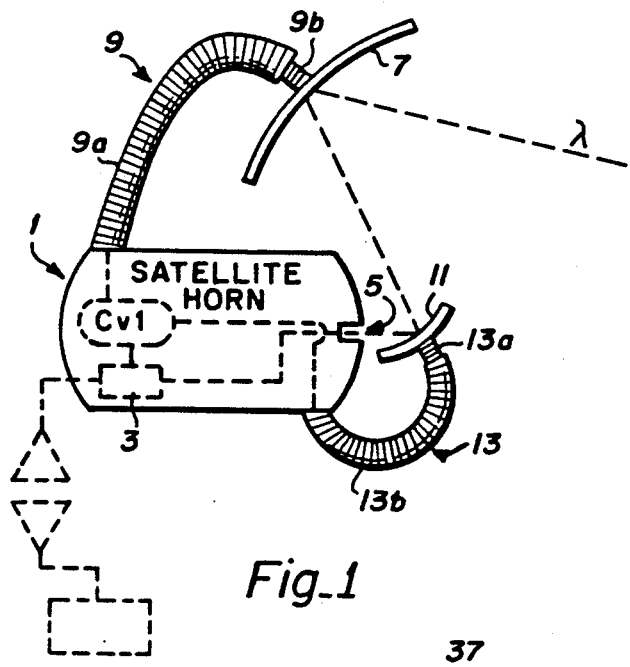
Fig_1
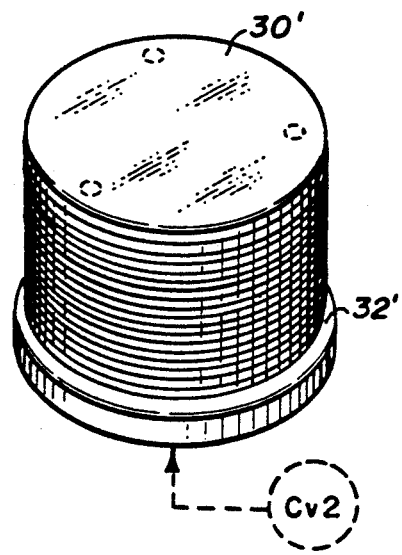
Fig_2
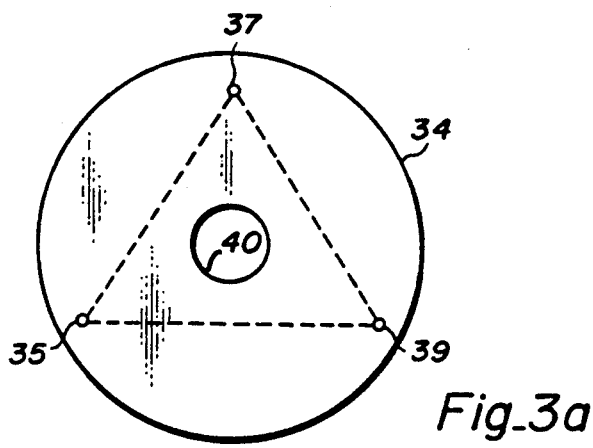
Fig_3a
Fig_3b
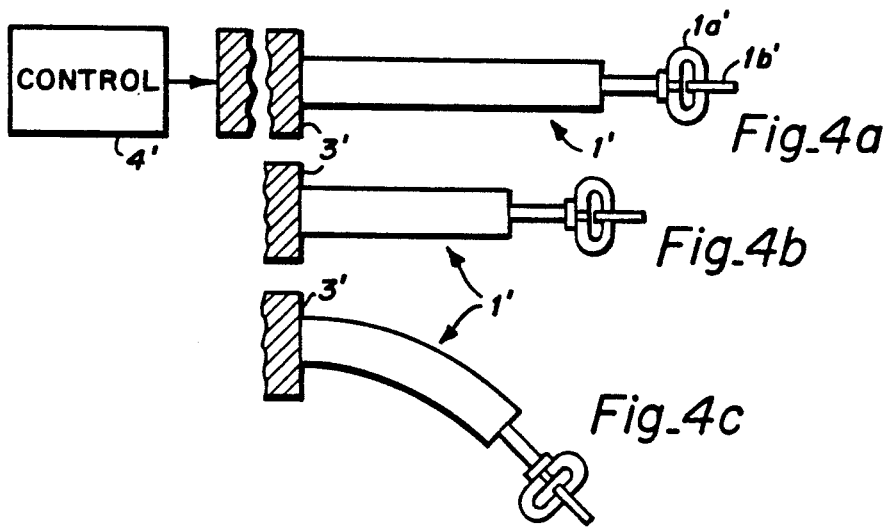
Fig_4a
Fig_4b
Fig_4c

ANTENNA WITH POSITIONABLE REFLECTOR

REFERENCE TO PRIOR APPLICATIONS

This application is a continuation in part of the application by the present applicant entitled Flexidigit Robotic Manipulator, Ser. No. 07/156,256 Filed Feb. 16, 1988 and now U.S. Pat. No. 4,848,179 granted July 18, 1989, the application entitled Robotic Arm Systems, Ser. No. 07/156,388 Filed Feb. 16, 1988, by the present applicant and R. D. Baker, and the application entitled Light Beam Ser. No. 07/304,148 Filed Jan. 1, 1989, by Positioner, Ser. No. 07/304,148 Filed Jan. 1, 1989, by the present applicant, all of which are co-pending herewith. Applicant claims the benefit of 35 U.S.C. 120 with respect to the subject matter of this application.

FIELD OF THE INVENTION

This invention relates to positionable energy reflecting surfaces of the kind employed to scan or direct electromagnetic energy, such as light and RF energy, and, more particularly, to a novel horn type microwave antenna having adjustable positionable elements for directing incoming and/or outgoing microwave energy.

BACKGROUND

In the prior application for patent entitled, Flexidigit Robotic Manipulator, Ser. No. 07/156,256 Filed Feb. 16, 1988 and now U.S. Pat. No. 4,848,179 granted July 18, 1989, ("the '256 application") there is described a structure of a novel positioning device in the form of an arm capable of assuming many shapes for positioning an object carried in a grip member or "hand", which structure is referred to as a "flexidigit robotic manipulator". In that novel positioning device a plurality of serially spaced disks is independently controlled in orientation and spacing relative to adjacent disks through use of electrically operated actuators and the like, whereby the positioning device may be configured into various curved shapes and extend or retract to different lengths with great versatility. Specifically the individual disks that together form the arm incorporate actuators that govern the disk spacing and orientation at three spaced locations so that the adjacent disk may be spaced and/or tilted relative to the other disk.

In one embodiment those actuators may be electromechanical devices, such as solenoids and/or servo motors and in other embodiments a piezo electric element. Reference is made to the description of the structure of the flexidigit robotic manipulator presented in the '256 application, which is incorporated herewithin by reference as part of this specification. Reference is also made to the companion application entitled Robotic Arm Systems, Ser. No. 07/156,388 Filed Feb. 16, 1988 ("the '388 application") that describes additional structures for such flexidigit robotic manipulator, "FRM", particularly the incorporation of a positioning device that contains a first part with larger size elements, depicted as an "arm", and a second part that is carried by the first that is of smaller size and more delicate construction, depicted as a "finger" and to the examples of electronic control circuits for controlling the position and shape of the FRM. That description in the '388 application is also incorporated herewithin by reference as part of this specification. In that FRM, the first section gives coarse control over position and the latter second section permits a more fine position control in positioning an object carried by the FRM.

The piezo electric type of actuators referred to above are useful in more delicate arms. Because of the small movements and inertia in those types of actuators, piezo electric actuators provide quick response to applied control signals. However, because the amount of physical movement each can provide is limited, they are more suitable for fine positioning. Further because the piezo electric type actuators are more fragile than types using solenoids or motors for positioning control, they are less adapted to carry heavy weights or should be useful in systems where weight is not a limiting factor, such as in gravity free outer space application.

Though the prior '256 application and the '388 application are each directed primarily to mechanical systems that physically transport and move other objects from one place to another, the FRM device is controllable through selected actuator operation to provide prearranged movements on a periodic basis or hold an object in a prescribed position and orientation. That capability permits the FRM to be incorporated as part of other apparatus which makes use of adjustably positional elements.

Microwave antennas of one known construction employ a horn, a sub-reflector and a larger sized main reflector, usually parabolic in shape, that are assembled into a fixed relationship. That relationship permits reception and transmission of microwave energy from remote transmitters and to remote receivers, respectively. The large main reflector collects the incoming propagated RF and focuses that electromagnetic radiation onto the sub-reflector and the latter in turn collects and focuses the radiation into the horn, where it is coupled to a receiver. Conversely, where the antenna is used for transmitting microwave energy, the radiation emanating from the horn is incident on the sub-reflector, is reflected thereby to the main reflector and is focused by the latter for propagation in an essentially straight line to a remote receiving antenna at which the antenna is aimed. For additional details of such a known device the reader may refer to available technical literature. Because the antenna elements are adjusted and fixed in position initially, it is difficult to adjust or optimize the spacing between elements after the antenna has been deployed in a relatively inaccessible location; for example, the antenna may be located on a space satellite deployed in outer space.

An object of the present invention is provide an improved horn type microwave antenna; to increase the versatility and optimize the performance of such antenna by including remotely controllable adjustment of antenna elements.

SUMMARY

According to the present invention, an antenna of the described type containing a horn and a pair of reflectors incorporates flexidigit robotic manipulators to support the reflectors, providing a more versatile microwave antenna; one which can be adjusted for optimal spacing between the antenna elements following deployment. Further an antenna so constructed can be controlled to aim incoming and outgoing high frequency RF beams allowing for accurate positioning and for scanning applications. Also, thermal expansion or contraction of supports can be compensated by active control of the manipulators.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

FIG. 1 illustrates the invention in pictorial form;

FIG. 2 is a perspective view of a piezo electric actuator assembly used in the embodiment of FIG. 1;

FIGS. 3a and 3b illustrate top and side views of a portion of the actuator assembly of FIG. 2;

FIGS. 4A through 4C symbolically illustrate a system containing a flexidigit robotic manipulator arm in several configurations to which the arm may be positioned;

DETAILED DESCRIPTION OF A PREFERRED EMBODIMENT

Figure 5:
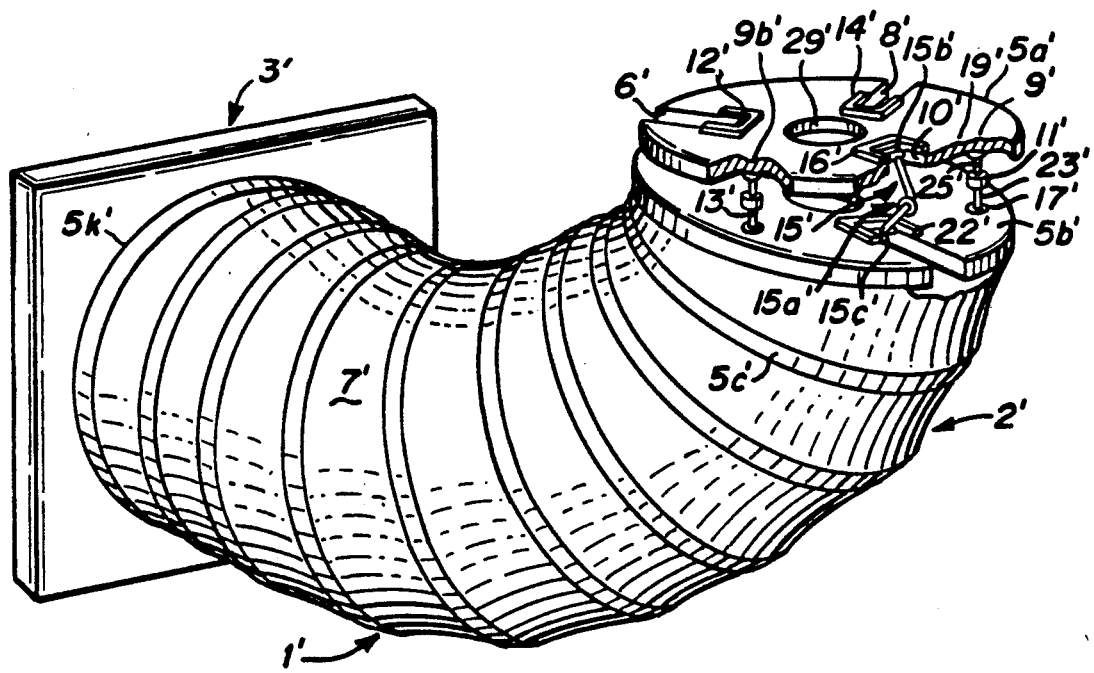
FIG. 5 is a partial perspective illustration of a form of flexidigit robotic manipulator used in FIG. 4A.

A preferred embodiment is illustrated in pictorial form in FIG. 1 and includes a space satellite 1 of known type which, among other conventional parts and systems on board, contains an RF receiver and transmitter combination 3, sometimes termed a transceiver, represented in dash lines, and an electromagnetic energy horn 5, symbolically illustrated, coupled to transceiver 3. The horn extends through a wall of the satellite and serves as the input and output passage between the interior and exterior of the satellite for passing microwave energy in the microwave energy transmission system containing transceiver 3. A main reflector 7 is attached to the satellite's wall by a support arm 9 and a sub-reflector 11 is attached to the satellite's wall by support arm 13. A control voltage source Cv1, symbolically illustrated, is coupled to arms 9 and 13; the source has its input connected to receiver 3. Suitably the support arms are stowed within the satellite and are extended for deployment as shown in the figure. The reflectors are of known physical properties and have a surface capable of reflecting the energy directed at them; preferably they may be of metal or of a composite material with a metal coating or layer as the energy reflective surface.

As illustrated support arm 9 includes a first section 9a, referred to as a coarse positioning arm, and a shorter second section 9b, referred to as a fine positioning arm. In like manner sub reflector 11's support arm 13 contains a coarse positioning section 13a and a fine positioning section 13b. Each of the support arms is a flexidigit robotic manipulator, FRM, described in the prior applications for patent.

The details of coupling the end of the support arms to the satellite do not form a part of the invention and are not necessary to an understanding of the invention. Hence those details are not illustrated. However, those connections may comprise any suitable mechanical coupling means and suitable electrical connectors for permitting control signals to pass through the support arms in accordance with the more detailed descriptions presented in the prior '256 and '388 applications to which reference may be made as desired.

The structure of the coarse section of the arms may be formed of disks and actuators of the solenoidal or motor type as described in the '256 application. The fine section is preferably formed of smaller more quick acting members also in accordance with the applicant's prior teachings, suitably using piezo electric type actuator elements. These and other forms of a flexidigit robotic manipulator provide the antenna element supports in this embodiment. As described in the prior applications if the intended application is in a gravity free environment, then the weight of the arm is not a limiting factor to the support arms size and length. The arm cannot fall apart or break due to the weight of the elements as deployed in outer space.

A flexidigit robotic manipulator may be controlled by electronic control circuits as assists the operator to more easily position same, although actuator circuits may be independently operated by the operator, with one circuit for each actuator, to effect a change in shape or orientation of the support arm. Control circuits of the kind are described in the prior '388 application. In the prior application of Ubhayakar and Baker, various electronic circuits are described through which the support arm position and/or orientation is controlled. Control circuits of that type or any type of control circuit may be used to control operation of the actuators that drive the elements of the arm; hence, position of the arm defines the antenna configuration in respect of the physical relationship between the reflectors and the horn.

Figure 6A:
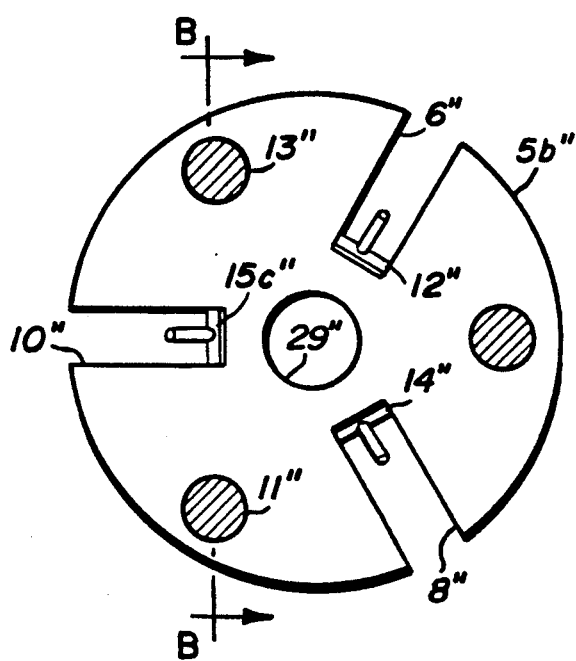
FIG. 6A is a side section view of two elements used in the manipulator of FIG. 5.
Figure 6B:
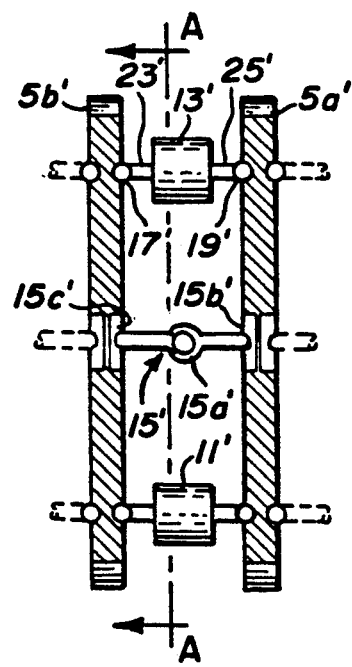
FIG. 6B is a section view taken from the top of FIG. 6A, each of which is drawn to a larger scale than FIG. 5.

Control signals originating from the remote station or originating locally within the satellite 1 from a control source, as represented by Cv1, control the orientation of support arm 9 and thereby may a the position of main reflector 7 for optimum performance or tracking either under operator control or automatically if suitable electronic null detection and control circuits are incorporated. The main reflector is positioned or aimed at a remote transmitter to receive and reflect microwave energy propagating to the antenna from the remote microwave transmitter to the sub- reflector. In turn, the sub reflector is positioned to reflect that microwave energy to the horn. Conversely, the same structure serves to direct microwave energy generated in the satellite transceiver and exiting the horn to the sub reflector and thereby to the main reflector, which allows that energy to propagate toward a distant receiving station or other object. FIGS. 4A, 4B, 4C, 5, 6A, and 6B are reproductions of the corresponding figures presented in and described in applicant's prior co-pending application, now U.S. Pat. No. 4,848,179. The reader interested in a more extensive description of the elements thereof may make reference to that patent, which is incorporated herein by reference.

Through control of the flexidigit robotic arm in accordance with the teachings of the prior applications, the main reflector may be adjusted to point toward incoming microwave energy in any of a variety of positions while maintaining the main reflector to reflect energy to the sub reflector. Moreover for extreme movement both the main reflector and the sub-reflector may be adjusted in synchronism so as to maintain the maximum coupling between the main reflector, sub reflector and horn while the position is changed. In still other applications the control signals serve to cause the arm to move in a predetermined path on a periodic basis as and if the antenna is to be used to "scan" over a large area "looking" for a microwave radiation source.

The antenna is effectively packed into the satellite while the unit is on the ground where gravity is an influence. Thereafter when the satellite is in orbit the support arms may be unpacked or unfolded to form the antenna in the gravity free environment.

The piezo electric elements in the fine section are quick to respond and are capable of expanding within a few milliseconds following application of an actuating voltage. This property allows for a fast sweep or adjustment. Moreover, although the amount of electrical voltage prompted expansion of the piezo electric material is limited, the fine section of the arm is built up of a number of such piezo electric elements and disks, which are effectively mechanically coupled in series. The minute movements of any one actuator is added with like movement of the other actuator to cumulatively cause a significant mechanical movement. Moreover, in the application illustrated, which is an outer space environment in which weightlessness exists, the strain caused by the weight of the reflector on the arm, that is the shear force, is negligible. In applications in which the weight of the supported reflector becomes a significant factor, other less agile structures, those having greater inertia, may be used instead.

By leaving the coarse section static, the fine section may be operated to change positions quickly. The antenna's main reflector may thus be moved from point to point, back and forth quickly, to alternately focus upon microwave transmissions from two spaced apart remote satellites or, alternatively, to send microwave signals to such spaced satellites in repetitive sequential order.

The specific form for the fine section of the manipulator may be of any one of a variety of structures, including that disclosed in the prior applications for patent referred to earlier in this specification, such as the piezoelectric type, specifically that presented in the prior application, Ser. No. 07/304,148 Filed Jan. 1, 1989 entitled Light Beam Positioner ("the '148 application"), the contents of which are incorporated herewithin by reference. As presented pictorially in perspective in FIG. 2, the fine section of the manipulator is formed of a stack of the wafers on a base 32, the latter of which may form part of or be attached to the manipulator's coarse section. The end wafer is adapted to carry the reflector surface. The end wafer may also be formed to shape to define a reflector surface.

Suitably control voltages from a control voltage source, Cv2, symbolically illustrated, are applied to the electrical leads, not illustrated, to adjust the physical dimension of each piezoelectric in the actuator. In so doing the angle of tilt of the reflector supported by the piezo electric stack is selectively changed. This stack of disk shaped wafers, a pair of which are illustrated in part in greater detail in the accompanying FIGS. 3a, showing a top view of a portion, and 3b, showing a side view of the portion of FIG. 3a, includes disks 34 and 36, separated by and bonded to a triad of barium titanate piezo electromechanical transducers 35, 37 and 39, each of which serves as an actuator. Metalized leads, not illustrated, lead from either end of each transducer through a central opening 40 for connection to external sources of dc control voltages.

When each actuator is independently subjected to different voltages each strains to a different extent, thereby orienting one of the wafers at a unique angle with respect to the adjacent wafer. When a large number of such wafer pairs are stuck together to form a lengthy stack and each transducer is separately controlled, one may orient the top most wafer with respect to the bottom most wafer at an infinite variety of inclinations.

Accurate orientation and positioning of an antenna and its sub-reflector with respect to the satellite is very critical to the performance of communications systems. The flexidigit robotic manipulator serves to fulfill that function in the antenna. On line positioning and orientation for compensating for errors due to misalignment, thermal distortion and the like; systolic movement; antenna stowage in compact form during flight with deployment upon reaching orbit; damping unwanted vibrations by selective control of actuators to shift the frequency of vibration resonance are features achieved with the disclosed structure.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In combination with a satellite, said satellite containing therewithin an RF receiver for receiving control signals from a remote source and having a wall defining an exterior boundary to said satellite, microwave horn means forming a microwave transmission passage through said wall; main reflector means for reflecting incident microwave energy; sub-reflector means for reflecting incident microwave energy; first elongated support means for supporting said main reflector means to said wall in spaced relationship to said sub reflector means and said horn means; second elongated support means for supporting said sub reflector means to said wall in spaced relation to said horn means and said main reflector means, said sub reflector means being positioned to reflect microwave energy between said main reflector mean and said horn means; the improvement wherein at least one of said first and second support means comprises:

a flexidigit robotic manipulator for positioning a reflector means, said flexidigit robotic manipulator comprising:

a multidigit arm, said arm containing a plurality of at least two sections including: a first course manipulator section and a second fine manipulator section, and with said fine manipulator section being coupled to and carried by said course manipulator section, each of which sections is positionable angularly and spatially to a predetermined degree with respect to an adjacent section, and said arm being capable of forming a plurality of curves to position an end thereof at selected locations, whereby said support means is changeable in position; and wherein said course manipulator section comprises further:

a series of at least two platform means; said platform means being spaced apart with one of said platform means including means for holding said fine manipulator section and with each of said platform means having an axis;

position control means for bearing the axial and torsional loads imposed on said platforms and positioning each of said platforms in said series relative to one another, said position control means comprising:

stabilizer means disposed between adjacent ones of said platform means in said series of platform means, each said stabilizer means further comprising:

at least three arm assemblies located spaced essentially evenly about the center of said platform means;

each of said arm assemblies including further: a pair of arms, joint means and a pair of anchor means; each arm in said pair of arms being joined together at one end by said joint means to form an articulated arm with said joint means permitting universal movement between said arms of said arm pair and with the remaining ends of each arm in said pair being movably attached to respective adjacent ones of said platform means by a corresponding one of said associated pair of anchor means with each said anchor means being adapted to permit the associated pair of arms to rotate in a plane generally normal to the surface of said adjacent ones of said platform means; and actuator means spaced from said stabilizer means and being disposed between adjacent ones of said platform means in said series to platform means for moving a platform means relative to an adjacent platform means;

said actuator means being capable of sustaining a longitudinally directed force applied by mechanical loading and being incapable of resisting rotational movement of one of said platform means relative to the adjacent one of said platform means applied by said mechanical loading;

whereby axially directed forces and torsional forces applied to said position control means are separately selectively absorbed, respectively, by said actuator means and by said stabilizer means.

2. The invention as defined in claim 1 wherein said fine manipulator section further comprises: a plurality of disks arranged in serial order adjacent one another to form a support for a reflector means and with each pair of adjacent disks defining a region therebetween; each of said regions including a plurality of three actuators evenly spaced about the periphery of adjacent disks and being coupled thereto, said actuators each comprising a piezoelectric means responsive to a selected levels of voltage applied thereto for providing a corresponding changes in the length thereof, whereby corresponding locations on adjacent disks may be varied; and control voltage means for selectively applying voltages to said actuator means, whereby the attitude and orientation of said reflector means may be changed.

* * * * *